(12) United States Patent
Kelley et al.

(10) Patent No.: US 8,617,747 B2
(45) Date of Patent: Dec. 31, 2013

(54) ELECTRODE PLATE FOR A BATTERY

(75) Inventors: Kurtis C. Kelley, St. George, ME (US); Mohamadkheir Alkhateeb, Dunlap, IL (US)

(73) Assignee: Firefly Energy, Inc., Peoria, IL (US)

( * ) Notice: Subject to any disclaimer, the term of this patent is extended or adjusted under 35 U.S.C. 154(b) by 1067 days.

(21) Appl. No.: 12/391,881

(22) Filed: Feb. 24, 2009

(65) Prior Publication Data

US 2010/0216025 A1 Aug. 26, 2010

(51) Int. Cl.
*H01M 4/74* (2006.01)
*H01M 4/82* (2006.01)

(52) U.S. Cl.
USPC .......... 429/241; 429/128; 429/225; 429/228; 429/204; 29/623.1

(58) Field of Classification Search
USPC .......... 429/128, 225, 228, 241, 204; 29/623.1
See application file for complete search history.

(56) References Cited

U.S. PATENT DOCUMENTS

| | | | |
|---|---|---|---|
| 2,833,846 A | 5/1958 | Wheat | |
| 4,417,608 A | 11/1983 | McCartney, Jr. et al. | |
| 4,439,916 A | 4/1984 | Faber | |
| 4,440,838 A * | 4/1984 | Schmidt | 429/250 |
| 4,788,113 A * | 11/1988 | Bohle et al. | 429/139 |
| 4,874,681 A * | 10/1989 | Rippel | 429/210 |
| 5,276,960 A | 1/1994 | Wheadon et al. | |
| 5,958,625 A | 9/1999 | Rao | |
| 6,979,513 B2 | 12/2005 | Kelley et al. | |
| 7,033,703 B2 | 4/2006 | Kelley et al. | |
| 7,105,252 B2 | 9/2006 | Kelley et al. | |
| 7,341,806 B2 | 3/2008 | Kelley et al. | |

OTHER PUBLICATIONS

International Preliminary Report on Patentability, PCT/US2010/025162 (Sep. 9, 2011).

* cited by examiner

*Primary Examiner* — Patrick Ryan
*Assistant Examiner* — Alex Usyatinsky
(74) *Attorney, Agent, or Firm* — Husch Blackwell LLP; Robert C. Haldiman

(57) ABSTRACT

An electrode plate for a battery comprising a plurality of electrodes in a grid where the grid defines a plurality of spaces. A paste disposed in the spaces has a top surface and a bottom surface. The paste is narrowed in the space, defining a distance between the top surface of the paste and the bottom surface of the paste that is less than the thickness of the plate over the electrodes. A retention layer of porous fabric is impressed on the top and/or bottom surface of the paste. Electrolyte disposed in electric communication with the electrodes.

32 Claims, 5 Drawing Sheets

ELECTRODE PLATE FOR A BATTERY

BACKGROUND OF THE INVENTION

1. Field of the Invention

The present invention is in the field of lead acid batteries, the structure of the plates for lead acid batteries and methods of manufacturing the same.

2. Related Art

Traditionally, lead acid batteries have included positive plates and negative plates that are immersed in electrolyte and sealed to make the battery. The plates are each made of essentially two elements. The two plate elements include a grid such as that depicted in FIG. 1 which was an electro-conductive material such as lead. This grid comprised an electrode. The plate was completed by embedding this grid in a paste which was a clay-like material in consistency and was electro-conductive. This positive active material (PAM) or negative active material (NAM) filled the spaces between the grid lines or electrodes. These spaces, when filled with paste, were referred to as pellets. Encasing the electrode grid in the paste also established a thin layer of paste on both the top and bottom of the electrodes. When thereafter cured and immersed in electrolyte, the paste created an electroactive pathway between the electrodes and electrolyte. This electroactivity of the paste is high close to the electrodes and diminishes significantly as distance from the electrodes increases. In the traditional, prior art plate structure, the center of the pellet, being farthest from the electrodes, is significantly less electroactive than the cured paste immediately adjacent the electrodes.

FIG. 2a depicts the typical positive plate prior art structure. It shows a cross section of the grid shown in FIG. 1. Electrodes 12 are embedded in paste 14 forming a plate. The plate is then assembled in the battery such that it is surrounded by electrolyte 16. As is best seen in FIG. 2b this structure creates areas of high electroactivity between the electrode 12 and the electrolyte 16, which areas are indicated at 18. However, areas of low electroactivity 20 are also created by the prior art structure. The areas of low electroactivity 20 add weight to the battery without adding power or capacity, and were effectively wasted space in that regard.

This structure had two advantages however. First, it was easy to manufacture. Second, it was robust enough to resist breaking during assembly and cracking during repeated cycles of battery use. Hence, for the sake of structural strength, simplicity and manufacturing expedience, performance suffered.

SUMMARY OF THE INVENTION

The invention is an electrode plate apparatus and method of manufacturing that maintains a thickness of electroactive paste between the electrode and the electrolyte that is small enough to maintain high electroactivity, by eliminating the areas of less effective active material paste in the space in the center of each pellet. The present invention supplements currently widespread manufacturing techniques for a lower cost implementation of higher performance structures.

In one aspect of the invention, a plate for a battery comprises a plurality of electrodes configured as a grid. The grid defines a plurality of spaces. A paste is disposed within each of the spaces, and may extend over a top surface of the electrodes comprising the grid and under a bottom surface of the electrodes comprising the grid. The paste is dimpled or indented in a location substantially in the center of each of the plurality of spaces, such that the plate is narrower within the spaces and thicker at the electrodes of the grid. A retention layer is incorporated in the top surface of the paste and a second retention layer may be incorporated in the bottom surface of the paste. In one aspect of the invention, the retention layer may be comprised of glass fiber or a polyolefin such as polyethylene, polypropylene or polyester.

In another aspect of the invention, the electrodes include a layer of carbon foam interposed between the electrode grid, as for example comprised of lead, and the electroactive paste layer. In such an embodiment, the carbon foam may be incorporated in both a plate cured, constructed and arranged to be a negative plate and may be interposed separately in a plate cured, constructed and arranged to be a positive plate. In another aspect of the invention, the narrowed structure having a retention layer is incorporated only in the positive plate.

Another aspect of the invention is a method of manufacturing the above structure. According to the method of the present invention, an electrode grid is pasted according to known techniques. Thereafter, the freshly pasted electrode grid is advanced between rollers, at least one of which is textured in order to indent the spaces between the electrodes of the grid. Advantageously, the retention layer or layers may be fixed to a top and/or bottom surface of the pasted plate by interposing a layer of glass fiber or polyolefin material between the pasted plate and one or both of the rollers as the pasted plate is advanced between the rollers. Curing of the thus pasted plates assembled with retention layers may thereafter be executed according to known techniques.

Thus, the structure of the positive plate of the present invention is "quilted" such that an indentation, narrowing or hole is established substantially in the center of each pellet, in order that the narrowed space or hole may be filled with electrolyte, thereby realizing an advantageous increase in performance. The retention layer advantageously strengthens the overall structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 3:
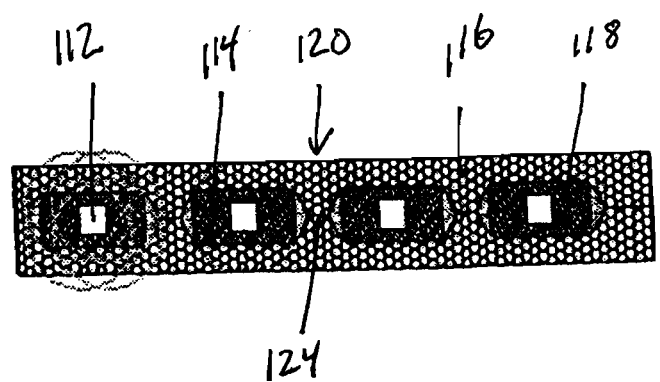
FIG. 3 is a cross section of an electrode plate of the present invention depicting electrolyte.

FIG. 3 is a cross section of the structure of the positive plate of the present invention. In it are shown electrodes 112. They are completely surrounded by and embedded in active material paste 114. However, an area 120 between the grids has a narrowed thickness of active material paste or no active material paste at all, thereby comprising a hole 124.

Figure 1:
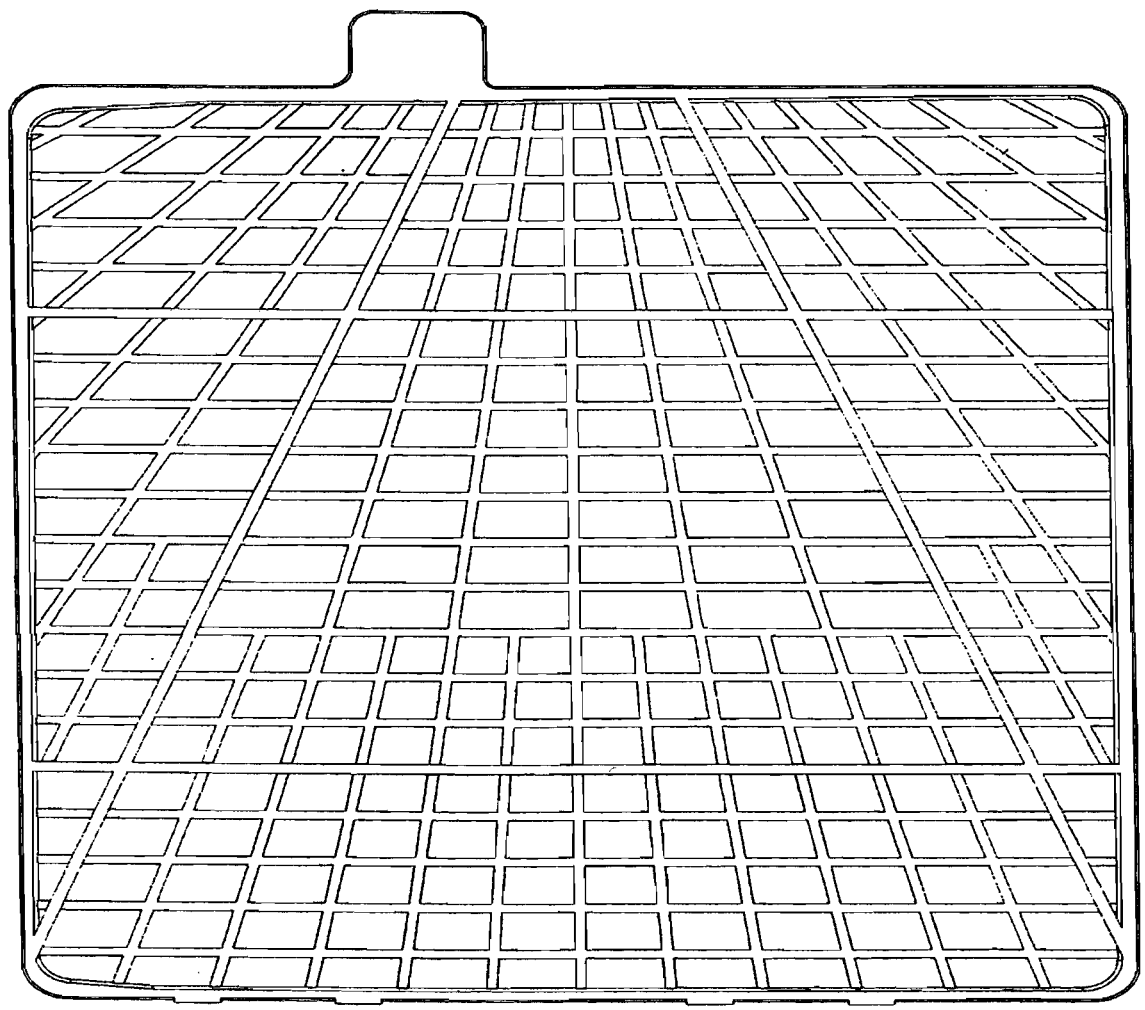
FIG. 1 is a picture of an electrode grid.
Figure 2A:
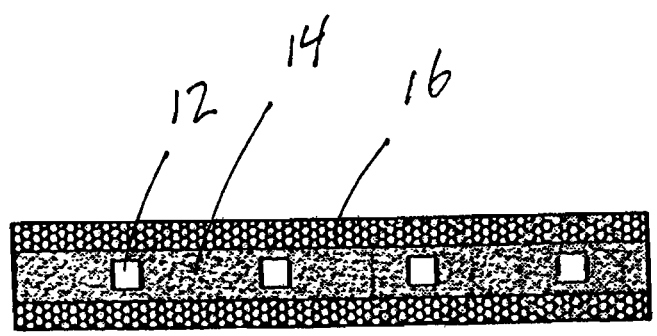
FIG. 2A is a cross section of a prior art electrode plate.
Figure 2B:
FIG. 2B is a cross section of a prior art electrode plate.

FIG. 3 depicts the structure of a positive plate after assembling into a battery. According, liquid electrolyte 116 can be seen surrounding the plate structure. The plate having been manufactured with narrowed pellet centers or holes 120, upon assembly the electrolyte enters these spaces. As is evident, spaces that in the prior art structures have been areas of low electroactivity (20 in FIG. 2B), have been eliminated. The space left by hole 120 is now filled with electrolyte 116, meaning that electrolyte is now within a distance promoting high ion exchange with the electrode and high electroactivity between the electrodes. The electrolyte is to the side of each electrode, as well as on the top and bottom of each electrode. Accordingly, the area of high electroactivity has been expanded in surface area. The expansion of the volume of the highly electroactive portion of the paste, and the surrounding of the electrodes with electrolyte so that a high activity distance is maintained all the way around each electrode, leads to greater electroactivity in the battery and higher performance.

Figure 4:
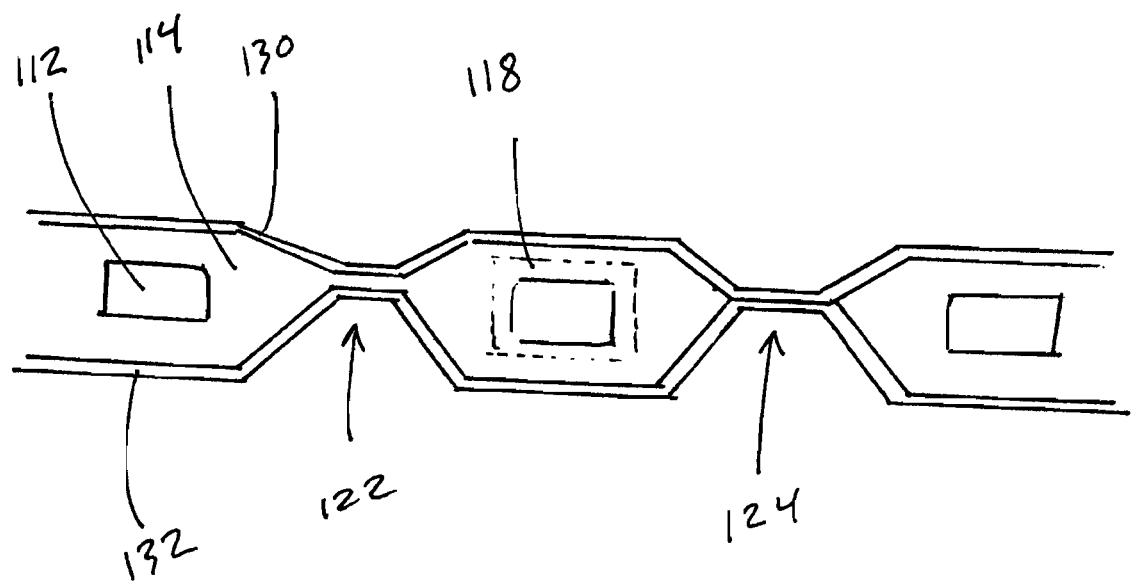
FIG. 4 is a cross section of the present invention showing retention layers.
Figure 5:
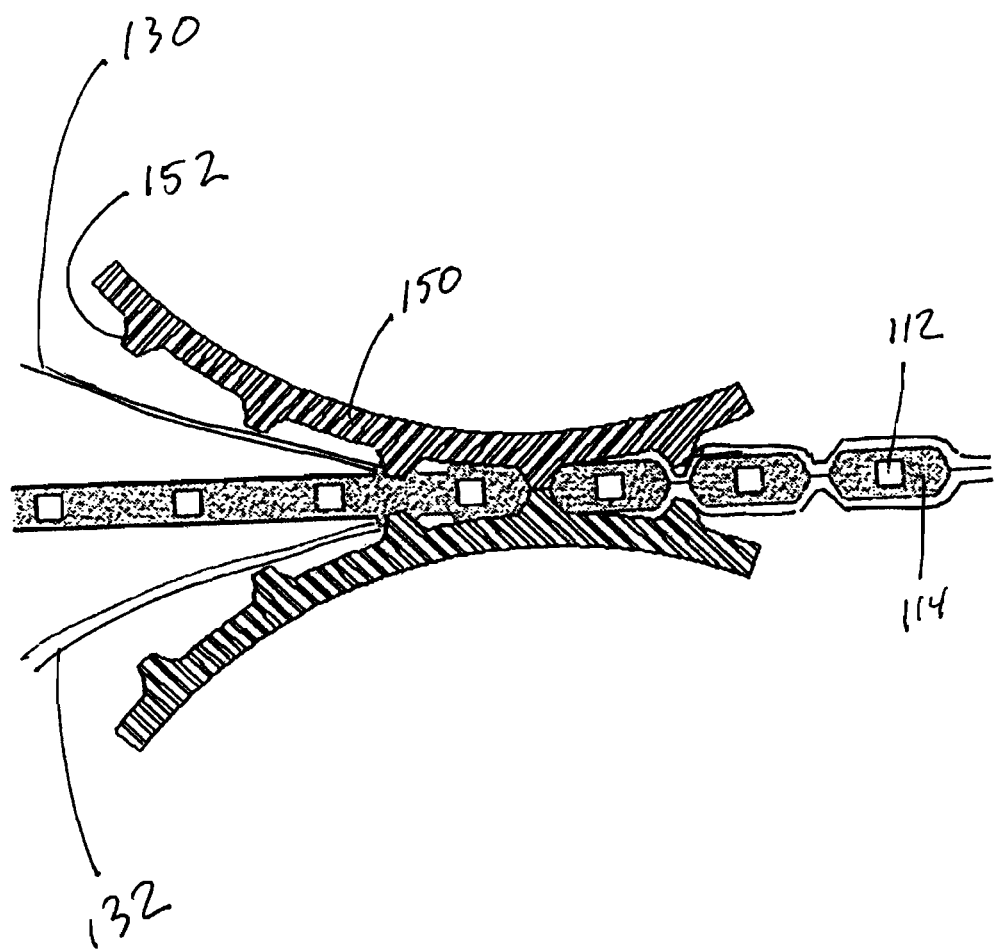
FIG. 5 is a cross section of assembly equipment executing the method of the current invention.

FIG. 4 depicts the electrode plate of the present invention including retention layers. As previously stated, electrode 112 is surrounded by paste 114. The pellets or spaces between electrodes 112 are narrowed relative to the thickness of the plate measured at the electrodes. These narrowings may comprise a dimpling or a narrow portion of paste 122. Alternatively, the narrowings may comprise throughholes 124. The electrode and paste combination may comprise simply electrode 112 immediately surrounded by active material paste 114. Alternatively, the electrode may be proximally joined with a carbon foam 118 and thereafter embedded in paste 114.

The invention further comprises a top retention layer 130 and/or a bottom retention layer 132. The retention layers are porous materials, such as woven fabrics. In an embodiment where the narrowings are throughholes 124, a top retention layer 130 and a bottom retention layer 132 may touch each other in the throughhole 124.

The retention layers may be made of a variety of materials. They may be as thin as two thousandths of an inch thick or 2 mils, as for example with polyethylene film. Porosity in such thin materials may be as low as 40 percent without losing the advantageous effects of the structure of the present invention. Conversely, thicknesses of retention layers may be greater, for example as much as about one millimeter, as for example may be the case with woven materials. In the event that the retention layer is comprised of a thicker material, higher porosities are advantageous. For example, a retention layer substantially about one millimeter thick would advantageously have a porosity of substantially about 85 percent or higher. In an embodiment having a thicker retention layer, as for example about one millimeter thick, the invention would encompass a battery constructed and arranged of such plates having thicker retention layers, which battery would omit separators between plates.

The retention layers may be comprised of glass fiber or selected ones of a class of polyolefins including polyethylene, polypropylene or polyester. The presence of these retention materials advantageously strengthens the overall plate assembly such that it may be constructed and arranged into a battery without breakage. The retention materials are also resistant to dissolution in the electrolyte material, typically an acid such as sulfuric acid. Accordingly, the retention materials 130 and 132 further toughen the plate assembly after installation of the battery so that it will remain durable through a plurality of charge and discharge cycles. In the depicted embodiment, there is substantially no electroactive paste outside the retention layers relative to the electrodes.

The method of the present invention includes creating the narrowing or hole 120 and adding the retention layers 130, 132. This is achieved in a first step of encasing the electrode grid 112 in active material paste 114, as current widespread manufacturing techniques are already set up to do. In the manufacturing technique of the present invention, a next step is to create a dimple, narrowing or hole between each electrode 112, preferably substantially in the center of the pellet. This is achieved in the depicted embodiment with rollers 150 having bosses 152. The positive plate comprised of the electrode 112 and active material paste 114 enters the roller assembly whereupon the bosses, being preconfigured with the proper dimensions, engage the paste between the electrodes 112 and indent it. The indentations may be partial or complete. If complete, the end result will be a hole 124.

In another process step of the present invention, at least one retention layer 130 and/or 132 is impressed onto a top surface and/or bottom surface of the electroactive material paste 114. In the depicted embodiment, a retention layer may be fed into the space between rollers 150 contemporaneously with the advancement of the plate between the rollers. Thus, the same process step that indents the narrowings 120 in the pellets, also impresses the retention layer(s) onto the top and/or bottom surfaces of the paste. The paste at this step of the process is sufficiently plastic to receive and retain the retention materials onto its surfaces such that the retention layers stick there and remain attached during curing and ultimately during use in a battery.

In a next step the electrode plate, including the indented or holed pellets is dried, cured and solidified to be either a positive or negative plate. The plate is then assembled into a battery. In assembly, electrolyte will enter the space of the indentation or holes 120 between the grid electrodes 112, thereby creating the advantageous configuration made possible by the present invention.

In one embodiment, a battery made according to the present invention may have carbon foam incorporated into the electrode plates. A composite material or carbon foam may be a direct one to one replacement for the lead of which electrodes are traditionally comprised. Alternatively, a composite or carbon foam material may be interspersed between a lead core and the paste such as in area 118 as depicted in FIG. 4. The structure and composition of the present invention may be incorporated into the positive plate only, negative plate or both.

Performance is enhanced in the form of increased electroactivity and increased capacity at surprisingly high levels with the present invention. This is particularly true when used in combination with electrodes incorporating carbon foam material such as that disclosed in U.S. Pat. No. 6,979,513 B2, incorporated by reference herein and U.S. Pat. No. 7,033,703 B2, also incorporated by reference herein. Thus, a plate structure according to the present invention may be advantageously combined with carbon foam including a network of pores disposed such that the chemically active paste may penetrate the pores. The carbon foam may advantageously have a total porosity value of at least sixty percent, an open porosity value of at least ninety percent, an electrical resistivity value of less than about one olm-cm and/or may advantageously have a density of less than about 0.6 g/cm$^3$. The carbon foam material may be comprised of or include graphite foam, carbonized wood or graphitized wood. The incorporation of the carbon foam may include an intermediate bonding structure which may or may not have electroconductivity properties. The intermediate bonding structure, which may be used to bond the carbon foam material with a lead grid throughout the plate, or at a tab, may be comprised of a metal or a polymer, for example polypropylene. The carbon foam material may advantageously have an average pore size between about 0.25 mm and about 2.0 mm.

The structure and materials of the present invention may also advantageously be constructed and arranged in a bi-polar cell configuration wherein the dimpling of one side of the plate constructed according to the present invention may contact a bi-polar cell membrane. In another embodiment, the side of the plate contacting a bi-polar cell membrane may be the only side on which dimpling as disclosed herein is incorporated.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An electrode plate for a battery comprising:
   a plurality of electrodes configured as a grid, said grid having a thickness measured perpendicularly to a longitudinal axis of said electrodes at the point of measurement;
   a plurality of spaces disposed between said electrodes of said grid;
   a paste disposed in said spaces, said paste having a top surface and a bottom surface;
   a narrowing of said paste in said space, said narrowing defining a distance between said top surface and said bottom surface measured in a direction parallel to said thickness of said grid, said distance being less than said thickness of said grid in an area of said grid adjacent to said narrowing;
   a retention layer attached to at least one of said top surface or said bottom surface with substantially none of said paste being on a side of said retention layer opposite the electrode;
   whereby upon assembly electrolyte may enter an area between said electrodes defined by said narrowing.

2. The plate of claim 1 further comprising said plate being a positive plate.

3. The plate of claim 1 further comprising said retention layer being porous.

4. The plate of claim 3 further comprising said porosity of said retention layer being about 60 percent or higher.

5. The plate of claim 1 wherein said retention layer has a thickness in a range from about two thousandths to about ten thousandths of an inch.

6. The plate of claim 1 wherein said retention layer has a thickness up to about one millimeter.

7. The plate of claim 1 wherein said retention layer has a thickness of ten one thousandths of an inch or less and a porosity of 40% or greater.

8. The plate of claim 1 wherein said retention layer has a thickness up to about one millimeter and a porosity of 85% or greater.

9. The plate of claim 1 further comprising said retention layer being woven.

10. The plate of claim 1 further comprising said retention layer being comprised of a material selected from the group consisting of: glass fibers, polyethylene, polyester and polypropylene.

11. The plate of claim 1 further comprising said retention layer being attached in an area corresponding to substantially all of said electrodes.

12. The plate of claim 1 further comprising said retention layer remains in contact with one of said top or said bottom surface of said paste within said narrowing.

13. The plate of claim 1 further comprising said narrowing being a throughhole.

14. The plate of the previous claim wherein a top retention layer and a bottom retention layer touch each other in said throughhole.

15. The plate of claim 1 further comprising said electrodes incorporating carbon foam.

16. The plate of claim 1 further comprising said electrodes being carbon foam.

17. The plate of claim 1 further comprising said thickness including a layer of paste over said electrodes.

18. A battery comprising:
   at least one positive plate;
   at least one negative plate;
   said plates being immersed in an electrolyte;
   further comprising at least one of said plates comprises:
      a plurality of electrodes configured as a grid, said grid having a thickness measured perpendicularly to a longitudinal axis of said electrodes at the point of measurement;
      a plurality of spaces disposed between said electrodes of said grid;
      a paste disposed in said spaces, said paste having a top surface and a bottom surface;
      a narrowing of said paste in said space, said narrowing defining a distance between said top surface and said bottom surface measured in a direction parallel to said thickness of said grid, said distance being less than said thickness of said grid in an area of said grid adjacent to said narrowing;
      a retention layer attached to at least one of said top surface or said bottom surface with substantially none of said paste being on a side of said retention layer opposite the electrode,
   said electrolyte being in an area between said electrodes defined by said narrowing.

19. The battery of claim 18 further comprising said retention layer being porous.

20. The battery of claim 19 further comprising said porosity of said retention layer being about 60 percent or higher.

21. The battery of claim 18 further comprising said retention layer being woven.

22. The battery of claim 18 further comprising said retention layer being comprised of a material selected from the group consisting of: glass fibers, polyethylene, polyester and polypropylene.

23. The battery of claim 18 further comprising said retention layer being attached in an area corresponding to substantially all of said electrodes.

24. The battery of claim 18 further comprising said retention layer remaining in contact with one of said top or said bottom surface of said paste within said narrowing.

25. The battery of claim 18 further comprising said narrowing being a throughhole.

26. The battery of claim 18 further comprising said electrodes incorporating carbon foam.

27. The battery of claim 18 further comprising said electrodes being carbon foam.

28. The battery of claim 18 further comprising said electrodes are lead and said electrolyte being a solution of sulfuric acid and water.

29. The battery of claim 18 further comprising said thickness including a layer of paste over said electrodes.

30. The battery of claim 18 wherein said retention layer has a thickness of ten one thousandths of an inch or less and a porosity of at least about 40 percent.

31. The battery of claim 18 further comprising said retention layer having a thickness up to about one millimeter and a porosity of about 85% or greater.

32. The battery of claim 18 wherein said plates are constructed and arranged such that there is no separator between a first plate and an adjacent plate.

* * * * *